United States Patent Office 3,369,567
Patented Feb. 20, 1968

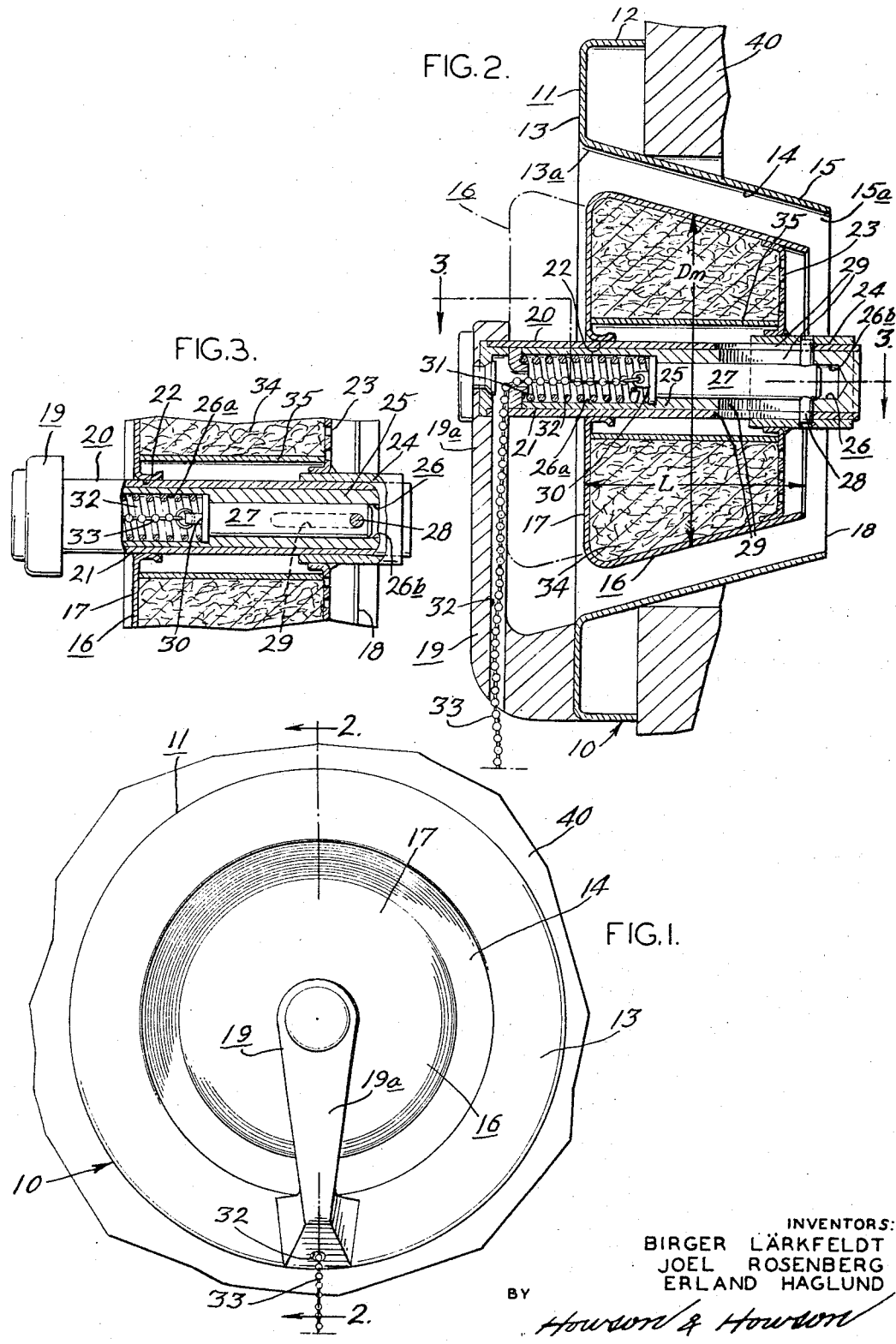

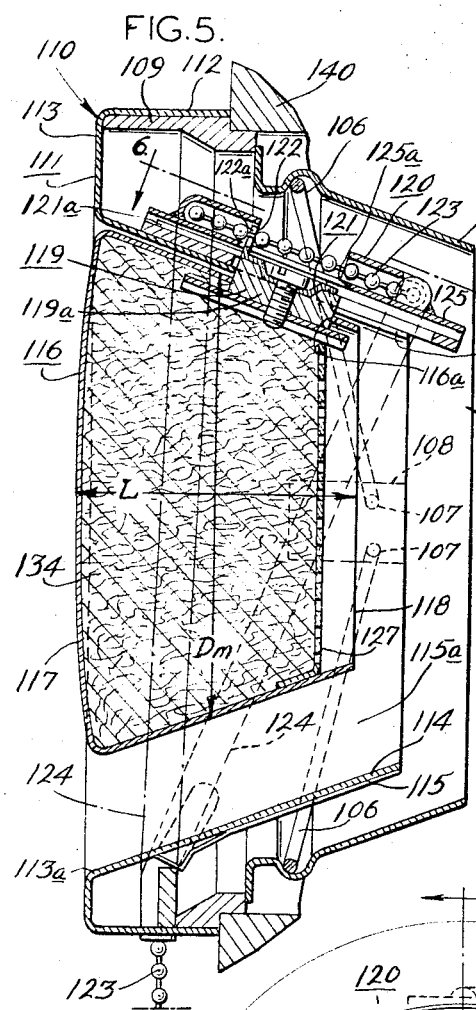
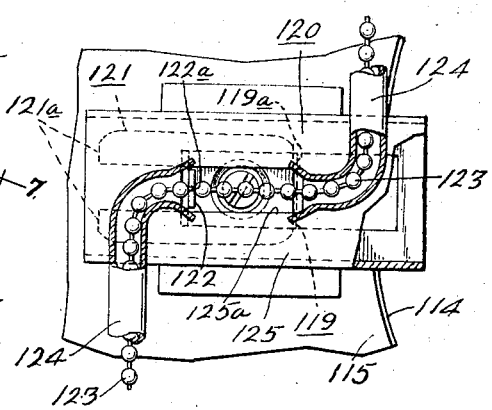
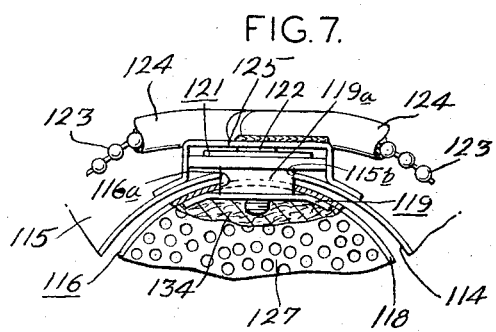
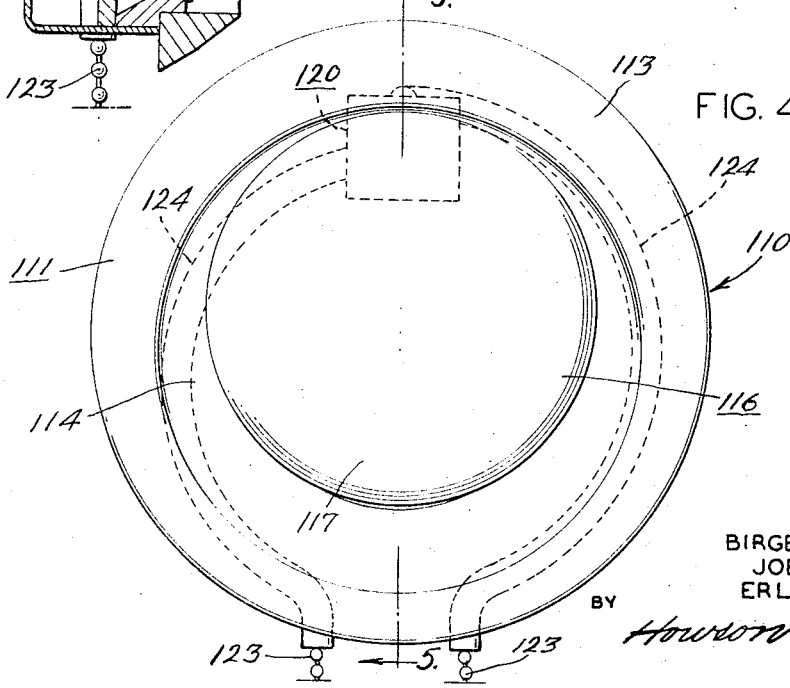

3,369,567
VALVE FOR GASEOUS MEDIUM
Birger Lärkfeldt and Joel Rosenberg, Jonkoping, and Erland Haglund, Mullsjo, Sweden, assignors to Aktiebolaget Svenska Flaktfabriken, Stockholm, Sweden
Continuation-in-part of applications Ser. No. 323,641, Nov. 14, 1963, and Ser. No. 333,974, Dec. 27, 1963. This application July 26, 1966, Ser. No. 568,031
Claims priority, application Sweden, Nov. 15, 1962, 12,288/62; Jan. 12, 1963, 347/63
16 Claims. (Cl. 138—46)

ABSTRACT OF THE DISCLOSURE

Apparatus for throttling air or other gaseous medium particularly adapted for exhaust valve assemblies in ventilating and air conditioning ducts. The valve assembly includes a frontal plate having a gaseous medium inlet aperture merging into a valve seat having a tapered sleeve like portion. The valve body, which is positionable in the seat with its widest portion adjacent the gaseous medium inlet, has the exterior shape of a truncated cone. The valve body is supported relative to the sleeve so that in the open position a slot shaped passage is formed intermediate the sleeve and the body, a valve body being provided with actuator means to permit substantially axial movement of the valve body relative to the sleeve and in this manner provide throttling of the gaseous medium as it passes across the valve body. The valve body, in order to decrease ambient noise due to the throttling action of the valve assembly, has a great length in the direction of flow, preferably equal to or greater than one-half the mean or average cross sectional diameter of the valve body so as to effect smoothing of the gaseous medium as it passes through the sleeve about the valve body.

Cross-reference to related applications

This application is a continuation-in-part application of two applications of the above listed inventors, filed respectively on Nov. 14, 1963, bearing the Ser. No. 323,641 and an application filed on Dec. 27, 1963, bearing the Ser. No. 333,974, both of these applications being now abandoned.

The present invention relates to a throttling valve for air or other gaseous medium and particularly throttling type valves serving as exhaust valves in ventilating and air conditioning plants.

More specifically, the present invention provides a valve assembly for air or other gaseous medium, which assembly comprises a frontal plate having a gaseous medium inlet aperture which merges into a valve seat, in the present instance including a tapered sleeve portion. Positioned in the seat with its widest portion adjacent the inlet is a valve body having an exterior shape of a truncated cone. Means are provided on the frontal plate to support the valve body relative to the sleeve whereby a slot shaped passage is formed therebetween. In addition, the valve body is provided with actuator means to permit substantially axial movement of the valve body relative to the sleeve so as to permit, when desired, throttling of the gaseous medium flow. For reasons which will become more evident hereinafter, the valve body has an axial length in the direction of flow of gaseous medium at least equal to one-half the average cross sectional diameter of the valve thereby creating a smoothing effect upon the gas flow through the sleeve about the valve body and incurring a decrease in ambient noise due to the throttling action of the valve.

State of the prior art

In ventilating and air conditioning systems ambient temperature is ofttimes controlled, at least in part, by exhaust valves and the like placed in the exhaust system. This type of control is common where either several rooms or spaces are connected to a common exhaust duct or where separate exhaust ducts are utilized in each space. In order to ventilate or cool at the desired rate it is oftentimes necessary to make adjustments to the exhaust flow and thus the valve is used as a throttling valve with the inherent, and normal, high pressure drop across the valve.

Because of increased demands for the most economic utilization of space, the trend in the ventilating and air conditioning field has been toward smaller ducting utilizing higher air velocities which have increased the problems inherent in throttling valve design. The major problem in gaseous medium throttling valve design is noise generation caused by severe turbulent conditions arising as the air flows across the valve and enters into the duct connected thereto.

Description of the invention

In view of the above it is a principal object of the present invention to provide a novel valve assembly for connection to air or gaseous medium carrying ducts, which assembly includes a valve body particularly adapted for operation as a throttling device to vary the gaseous medium flow across the valve.

Another object of the present invention is to provide a novel valve assembly which minimizes noise generation.

Still another object of the present invention is to provide a novel valve assembly having a configuration particularly adapted for branch duct throttling purposes.

An additional object of the present invention is to provide another novel valve assembly which is particularly adapted for use as a throttling valve in ducts wherein the assembly projects into a stream of gaseous medium moving substantially perpendicularly to the direction of gas flow through the valve.

Other objects and a fuller understanding of the invention may be had by referring to the following specification and claims taken in conjunction with the accompanying drawings in which:

FIG. 1 is a fragmentary plan view of a valve assembly constructed in accordance with the present invention and particularly adapted for mounting in postiion in a wall of a branch duct;

FIG. 2 is a fragmentary sectional view taken along line 2—2 of FIG. 1;

FIG. 3 is a fragmentary plan view taken along line 3—3 of FIG. 2 and as if FIG. 2 were not in section;

FIG. 4 is a fragmentary sectional view of another embodiment of a valve assembly of the type particularly adapted for projection directly into a stream of gaseous medium flowing substantially perpendicularly to the direction of medium flowing through the valve;

FIG. 5 is a fragmentary sectional view taken along line 5—5 of FIG. 4;

FIG. 6 is a fragmentary sectional view taken along line 6—6 of FIG. 5;

FIG. 7 is a fragmentary sectional view taken along line 7—7 of FIG. 5;

Figure 10:
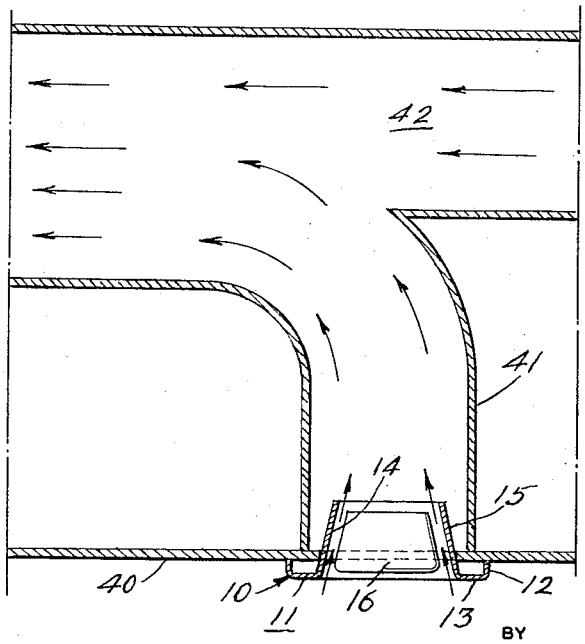
FIG. 10 is a schematic view of the valve assembly shown in FIGS. 1–3 positioned in a duct system having branch ducts connecting interior spaces.

Referring now to the drawings, and especially FIGS. 1, 2 and 10, a valve assembly 10, constructed in accordance with the present invention, is shown mounted on a wall 40 and projecting into a branch duct 41 which merges into a main exhaust duct 42.

In accordance with the invention, the valve assembly 10 is designed so as to minimize undesirable noises upon gaseous media, such as air passing across the valve and into the main exhaust duct 42. To this end the valve assembly 10 comprises a frontal plate 11 having an upstanding marginal wall 12 connected to an annular flat 13 which merges into a valve seat 14. As illustrated, the inner marginal portion of the flat 13 forms a smoothly rounded gaseous media inlet aperture 13a while the valve seat 14 comprises a tapered or conical sleeve portion 15, the terminal edge of the sleeve forming an outlet aperture 15a having a diameter less than that of the inlet aperture. Mounted interiorly of the conical sleeve is a hollow valve body 16 having an exterior shape of a truncated cone with a substantially closed base 17 and an open opposite terminal end 18. As shown in FIGS. 1 and 2, the valve body 16 is connected to support means 19 comprising, in the present instance, a cantilever 19a attached to the annular flat 13, the body being positioned concentrically or coaxially with the tapered sleeve 15, thus forming a slot shaped passage between the valve body 16 and the sleeve 15, in the present instance the passage or slot being in the form of a conical annulus.

In order to permit displacement of the valve body relative to the seat 14 whereby desired throttling of the gaseous flow may be adjusted, actuator means 20 is connected to the valve body via the support means 19. To this end, the actuator means comprises a tube 21 rigidly connected to the cantilever 19a, mounted coaxially of the conical valve body 16 and slidably engageable with an aperture 22 in the base 17 of the body 16. Internally of the valve body 16 is a foraminous plate 23, axially offset from the open end of the body 16, which plate connects the valve body to a cylinder 24 circumscribing the tube 21 and slidable therealong. Internally of the tube 21 is a sleeve 25 having a stepped bore 26, a larger diameter bore 26a at the end thereof adjacent the cantilever 19a and a smaller diameter bore 26b remotely positioned of the cantilever 19a. Slidable interiorly of the bore 26 is an actuator rod 27 which connects via a pin 28 the cylinder 24. As illustrated in FIG. 2 the sleeve 25 and the tube 21 contains slots 29 to permit limited axial movement of the rod 27 relative to the tube 21 and sleeve 25.

The upper end of the actuator rod 27 is provided with an abutment 30 and spaced therefrom at the opposite end of the larger diameter bore 26a is an end wall 31. Intermediate the end wall 31 and the abutments is biasing means, in the present instance a compression spring 32 which tends to cause the valve to remain in the position shown in FIG. 2. Connected to the abutment 30, extending interiorly of the spring and through a conduit 32 in the support means 19 is a chain 33 which permits movement of the valve body 16 relative to the sleeve 15. Catch means (not shown) may be provided at any convenient location for fixing the valve body relative to the sleeve in the desired position.

Although in the illustrated instance the valve body 16 is not used for closing off completely the flow of gaseous medium intermediate the sleeve and the exterior of the body, extending the slots 29 and the length of the tube and sleeve 21 and 25 respectively will permit engagement of the exterior wall of the valve body 16 against the radial edge of the outlet aperture 15a permitting closing of the valve assembly.

In order to minimize the noise inherent in a throttling valve structure wherein a pressure drop occurs across the valve creating such noises, it has been found, and in accordance with the invention, that the conical valve body should have a relatively great length L in relation to its mean cross sectional dimension or diameter $Dm$, at least equal to or preferably greater than half the mean cross sectional diameter. In mathematical form the length L therefore should be equal to or greater than one-half $Dm$ ($L \geq \frac{1}{2} Dm$). In this manner, it has been theorized (and one possible explanation for the reduction in noise level) that the air entering intermediate the valve seat and the exterior of the valve body has a relatively long distance of travel, despite the pressure drop, which creates a smoothing effect upon the gas flow thus reducing ambient noise.

It has also been found that in order to further decrease the sound level and to prevent noise transmission via the ducts and valves from one space to another space being served, for example by the common main exhaust duct 42 (see FIG. 10), the hollow valve body is preferably filled with a sound attenuating material, for example rock wool. As shown in FIG. 2, a sound attenuating material 34 is positioned intermediate the foraminous plate 23 and the base 17 of the valve, the foraminous plate serving to prevent the material 34 from escaping from the one end while the perforations associated therewith permitting entry thereinto of noise. Of course, to prevent the sound attenuating material from coming into contact with the exterior of the tube 21 and possibly jamming in the aperture 22 associated with the base 17 of the body 16, a tube 35 circumscribes the tube 21 and acts as a barrier to the insulating material.

Figure 8:
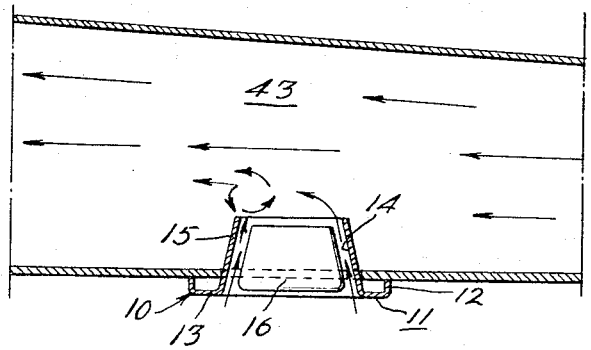
FIG. 8 is a schematic illustration of a valve assembly, such as illustrated in FIGS. 1–3, mounted and projecting into a duct having a stream of gaseous medium flowing substantially perpendicularly to the direction of medium flowing through the valve.

In certain instances it is desirable to mount the throttling valve assembly right against the main duct with the sleeve or valve seat projecting interiorly of the duct wherein air or other gaseous medium is flowing substantially perpendicular to the axis of the valve assembly. Such an arrangement is illustrated in FIG. 8 wherein the valve assembly 10 is positioned so that the sleeve 15 projects interiorly of a main duct 43. However, with this arrangement, air or other gaseous media entering intermediate the valve body 16 and the sleeve 15 causes extreme turbulence at the point of entry of the gaseous medium from the valve adjacent the down stream side of the valve (to the left as seen in FIG. 8 and indicated by the arrows). This turbulence creates an unnecessarily high noise level.

Figure 9:
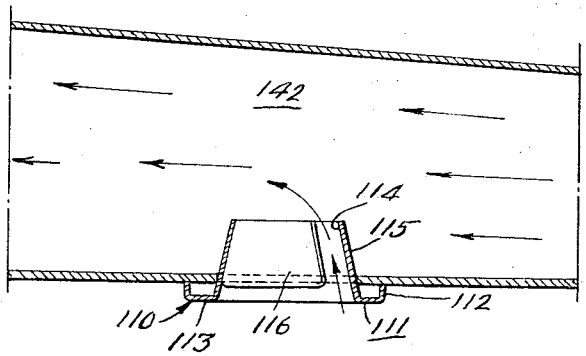
FIG. 9 is a schematic illustration of the novel valve illustrated in FIGS. 4–7 inclusive, and mounted similarly to the mounting shown in FIG. 8.

When it is desirable to mount a valve assembly, constructed in accordance with the present invention, wherein a portion of the valve assembly projects into a gaseous medium flow substantially perpendicular to the axis of the valve assembly, it is desirable that the valve body be placed eccentrically in the sleeve so as to form a crescent shaped air flow passage or slot intermediate the valve body and the sleeve, the crescent shape preferably having the largest opening portion adjacent the conical portion of the sleeve which is more coincident with the direction of flow of the gaseous medium in the duct. To this end in accordance with the invention, and as shown in FIG. 9, a novel valve assembly 110 is mounted on a wall 140 of a main exhaust duct 142. Referring to FIGS. 4 and 5, the valve assembly 110 comprises a frontal plate 111 having an upstanding marginal wall 112 connected to an annular flat 113 which merges into a valve seat 114. As illustrated, the inner marginal portion of the flat 113 forms a smoothly rounded gaseous medium inlet aperture 113a while the valve seat 114 comprises a tapered or conical sleeve portion 115, the terminal edge of the sleeve forming an outlet aperture 115a having a diameter less than that of the inlet aperture. As previously described with reference to FIGS. 1–3, mounted interiorly of the conical sleeve 114 is a hollow valve body 116 having an exterior shape of a truncated cone with a substantially closed base 117 and an open opposite terminal end 118.

In order to minimize turbulence when the valve assembly projects into a duct or the like wherein the gaseous medium flow in the duct is substantially perpendicular to the axis of the valve assembly, the valve body 116 is connected eccentrically to support means 119 to thus form a crescent shaped slot or passage between the valve body 116 and the sleeve 115.

While the support means and actuating means for moving the valve body 116 relative to the sleeve 115 may be such as that shown in FIGS. 1–3, (i.e. angulating the actuating means and decreasing the length of the cantilever), it has been found that less turbulence occurs before the inlet, when the valve body 116 is in contact with a portion of the sleeve 115, to mount the support means and actuator means in the sidewall of the sleeve 115. In order to provide sufficient space for mounting actuator means 120 and support means 119 in the sidewall of the sleeve 115 when the valve body 116 is contacting the sleeve, it is desirable to provide an annulus 105 projecting interiorly of the casing wall and connected thereto by any well known means. As illustrated in FIG. 5, the annulus 105 includes a radial groove adapted for the seating of a snap-ring like wire 106 which connects as at 107 to the sleeve portion 115 of the frontal plate 111. In the present instance, the sleeve 115 is provided with a lug 108, mounted preferably exteriorly of the sleeve 115, for receipt of the terminal end of the wire 106. To minimize leakage past the wall 112 of the frontal plate 111, a packing ring 109 is provided in sealing engagement against the wall 140. With this construction, both the frontal plate and the valve body 116 may be removed as a unit from the annulus 105 by pulling against the snap-ring 106 until it is over radial center permitting removal of the valve assembly from the casing for servicing and the like.

In order to permit displacement of the valve body 116 relative to the seat 114 whereby desired throttling of the gaseous flow may be adjusted, the actuator means 120 is connected to the valve body via the support means 119. As illustrated in FIG. 5, the sidewall of the valve body 116 is provided with an aperture 116a while the sidewall of the sleeve 114 is provided with an elongated slot 115b in which is positioned a slidable block 119a rigidly connected to the valve body 116 and movable in the slot 115b. A bracket 121 having a stabilizing projection 121a for riding along the outer periphery of the sleeve 115, is connected to the block 119a and includes an upstanding wall member 122 having a notch 122a therein (see FIG. 6), to firmly engage an actuator chain 123. As illustrated in FIGS. 4, 5 and 6, the actuator chain 123 is routed in a conduit 124 circumscribing the sleeve 115 to thereby permit displacement of the valve body 116 relative to the sleeve 115.

To prevent interference of the chain 123 with the projection 121a, a cover plate 125, having a slot 125a therein to permit movement of the upstanding wall 122 relative to the cover member, is positioned intermediate the projection 121a and the chain 123 (see FIGS. 5–7).

For the reasons heretofore set forth relative to the valve embodiment illustrated in FIGS. 1–3, internally of the valve body 116 is a foraminous plate 127, axially offset from the open end 118 of the valve body 116, which plate serves to hold between itself and the base 117 of the valve body 116, sound attenuating material 134.

As before with the valve embodiment illustrated in FIGS. 1–3 and in accordance with the invention, the conical valve body 116 should have a relatively great length L in relation to its mean cross-sectional dimension or diameter $D_m$, at least equal to or preferably greater than half the mean cross-sectional diameter.

Thus, the present invention provides a novel valve assembly for connection to air or gaseous medium carrying ducts, which assembly minimizes noise generation due to the throttling action of the valve. In addition, two embodiments have been shown, both constructed in accordance with the present invention, in which the one is particularly adapted for branch duct design while the other is particularly adapted for flush mounting wherein the stream of gaseous medium passing in the duct flows substantially perpendicular to the axis of the valve assembly. It should be recognized that the embodiment illustrated in FIGS. 1–3 may be used for flush mounting where the velocity of the flowing gaseous medium is relatively low, thus minimizing the turbulent effect heretofore described with reference to FIG. 8.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A valve assembly for air or other gaseous medium comprising a frontal plate having a gaseous medium inlet aperture merging into a valve set including a converging sleeve having an outlet; a similarly converging valve body having an exterior shape of a truncated cone and positioned in said seat to converge from said inlet towards said outlet, means to support said valve body relative to said sleeve to form a slot-shaped passage therebetween, actuator means connected to said valve body to permit movement of said valve body relative to said seat whereby an increase and decrease of gaseous medium flow is permitted between said body and said sleeve; said valve body having an axial length in the direction of flow of gaseous medium equal to at least one-half the average cross sectional diameter of said valve body, said sleeve having a length sufficient to cooperate with said valve body to create a smoothing effect upon the gas flow through said converging sleeve about said valve body and thereby decrease ambient noise.

2. A valve assembly in accordance with claim 1 wherein said valve body is positioned coaxially of said seat and said slot is in the form of a conical annulus.

3. A valve assembly in accordance with claim 1 wherein said valve body is positioned eccentrically of said seat and is movably mounted on the sidewall of said sleeve and whereby said slot is in the form of a crescent.

4. A valve assembly in accordance with claim 3 wherein the maximum opening of said crescent is adapted for placement in the direction most coincident with the direction of flow of the gaseous medium in a duct.

5. A valve assembly in accordance with claim 3 including a slot in said seat, means connecting said valve body through said slot and slidable therein, said actuator means connected to said connecting means and extending externally of said valve assembly.

6. A valve assembly in accordance with claim 1 wherein said valve body includes a perforated wall positioned remotely from said inlet, at the smaller diameter end of said valve body, and sound absorbing material mounted between said wall and the opposite end of said valve body.

7. A valve assembly in accordance with claim 1 wherein said support means includes a cantilever fixed to said frontal plate and including a tube rigidly connected to the cantilever and slidably connected to the valve body, said actuator means connected to said valve body through said tube and extending externally of said cantilever to permit movement of said valve body along said tube.

8. An exhaust duct system having a throttling valve assembly, said throttling valve assembly comprising a frontal plate mounted on a wall of said exhaust duct, said frontal plate having a smooth, rounded, gaseous medium inlet aperture merging into a valve seat and including a converging sleeve having an outlet; a similar converging conical valve body positioned in said seat to converge from said inlet towards said outlet, means to support said valve body relative to said sleeve to form a slot-shaped passage therebetween, actuator means connected to said valve body to permit movement of said valve body relative to said seat whereby an increase and decrease of gaseous medium flow is permitted between said body and said sleeve; said valve body having an axial length in the direction of flow of gaseous medium equal to at least one-half the average cross sectional diameter of said valve body, said sleeve having a length sufficient to cooperate with said valve body to create a smoothing effect upon the gas flow through said converging sleeve about said valve body and thereby decrease ambient noise.

9. An exhaust duct system in accordance with claim 8 wherein said valve assembly is mounted in the terminal end of a branch duct.

10. An exhaust duct system in accordance with claim 9 wherein said valve body is positioned coaxially of said seat and said slot is in the form of a conical annulus.

11. An exhaust duct system in accordance with claim 10 wherein said support means includes a cantilever fixed to said frontal plate and including a tube rigidly and coaxially connected to said cantilever and slidably connected to said valve body, said actuator means connected to said valve body through said tube and extending externally of said cantilever to permit movement of said valve body along said tube.

12. An exhaust duct system in accordance with claim 8 wherein said valve assembly is positioned in a sidewall of said exhaust duct and projects substantially perpendicular to the direction of gas flow in said duct.

13. An exhaust duct system in accordance with claim 12 wherein said valve body is positioned eccentrically of said seat and is movably mounted on the sidewall of said sleeve whereby said slot is in the form of a crescent.

14. An exhaust duct system in accordance with claim 13 wherein the maximum opening of said crescent is placed in a position more coincident with the direction of flow of the gaseous medium in said duct.

15. An exhaust duct system in accordance with claim 13 including a slot in said seat, means connecting said valve body through said slot and slidable therein, said actuator means connected to said connecting means and extending externally of said valve assembly.

16. An exhaust duct system in accordance with claim 8 wherein said valve body includes a perforated wall positioned remotely from said inlet and axially and inwardly spaced from the smaller diameter end of said valve body, sound absorbing material mounted between said wall and the opposite end of said valve body.

References Cited

UNITED STATES PATENTS

| | | | |
|---|---|---|---|
| 1,921,457 | 8/1933 | Dickinson. | |
| 2,125,454 | 8/1938 | Marshall | 98—41 |
| 2,644,389 | 7/1953 | Dauphinee | 98—41 |
| 3,010,692 | 11/1961 | Jentoft | 98—41 X |
| 3,015,469 | 1/1962 | Falk | 138—46 X |
| 3,037,528 | 6/1962 | Baars et al. | 138—46 |
| 3,112,007 | 11/1963 | Ludlow et al. | 138—37 X |

LAVERNE D. GEIGER, *Primary Examiner.*

B. KILE, *Assistant Examiner.*